United States Patent [19]
Yoshida et al.

[11] Patent Number: 5,105,355
[45] Date of Patent: Apr. 14, 1992

[54] METHOD AND APPARATUS FOR PRINTING ADDITIONAL CHARACTERS ON PREVIOUSLY PRINTED PAPER

[75] Inventors: Hiroichi Yoshida, Nara; Hiroko Murai, Yamatokoriyama, both of Japan

[73] Assignee: Sharp Corporation, Osaka, Japan

[21] Appl. No.: 534,181

[22] Filed: Jun. 6, 1990

[30] Foreign Application Priority Data

Jun. 9, 1989 [JP] Japan ................. 1-146955

[51] Int. Cl.⁵ .............................. G06F 3/12
[52] U.S. Cl. ................... 364/419; 400/279
[58] Field of Search ......... 364/930, 931, 931.5, 364/930.11, 419, 275.9, 226.1; 400/3, 17, 61, 279, 706

[56] References Cited

U.S. PATENT DOCUMENTS

| | | | |
|---|---|---|---|
| 4,561,793 | 12/1985 | Blanchard | 400/697.1 |
| 4,585,362 | 4/1986 | Gray | 400/697.1 |
| 4,668,114 | 5/1987 | Katsukawa | 400/279 |
| 4,692,045 | 9/1987 | Makita | 400/697 |
| 4,832,513 | 5/1989 | Ikekita | 400/61 |
| 5,030,023 | 7/1991 | Yoshimoto | 400/210 |

OTHER PUBLICATIONS

English language abstract of Japanese Unexamined Patent Publication No. 128419/1988.
English language abstract of Japanese Unexamined Patent Publication No. 233462/1988.

*Primary Examiner*—Gail O. Hayes
*Attorney, Agent, or Firm*—David G. Conlin; Robert M. Asher

[57] ABSTRACT

A text processing method and apparatus for storing inputted text data and for printing newly stored text data on paper on which text characters have been previously printed. The previously printed paper is set in a printer. New text data is input through a keyboard. The new text data is stored serially with the previously printed text data. Upon receiving a print instruction, the text data is serially searched. The paper is fed without printing whenever previously printed text data is searched. Characters are printed when the new text data is come across in the search.

4 Claims, 5 Drawing Sheets

FIG. 3

| T1 | 87·12·1 | THERMOSENSIBLE PAPER | D1 |
| T2 | 87·12·1 | 10 SHEETS | D2 |
| T3 | 88·1·10 | POST CARD | D3 |
| T4 | 88·1·10 | 12 PIECES | D4 |

FIG. 6

| 1 | THERMOSENSIBLE PAPER | D1 |
| 1 | 10 SHEETS | D2 |
| 0 | POST CARD | D3 |
| 0 | 12 PIECES | D4 |

METHOD AND APPARATUS FOR PRINTING ADDITIONAL CHARACTERS ON PREVIOUSLY PRINTED PAPER

BACKGROUND OF THE INVENTION

The present invention relates to a method of processing text and an apparatus for the same, such as a Japanese or English word processor.

A word processor is a device which can create text with various functions as stated below using computer technology, compared with a conventional typewriter in which text is made by typing characters one after another on paper. Such a word processor can (1) input and edit text while monitoring a soft copy of the text, (2) store the text created in a storing device as symbolized character string data, (3) read the stored text and re-edit it, and (4) output the created text as a hard copy.

The user can use the word processor in various ways because of its various functions. For example, the user may have to keep continuous records of office supplies by inputting and printing text data one day and further inputting text data on another day continued from the text already printed. However, with a conventional word processor, it is impossible to print new text on previously printed paper contiguous to the pre-printed text.

Instead, one must print the new text separately. This leads to a waste of paper already printed. One solution is to affix newly printed text or area-specified text to the previously printed paper, but this is a laborious task.

SUMMARY OF THE INVENTION

The present invention provides a text processing method for storing inputted text data by an input operation and for printing the stored text data on paper using a print insruction. This method involves (1) setting previously printed paper in or on the machine, (2) inputting new text data with an input operation, (3) using a print instruction to temporarily store both the previously printed text data and the new text data (4) serially searching the text data (5) feeding the paper without printing whenever the stored previously printed text data is searched and (6) printing data on the paper only when the new text data has been searched.

The present invention also provides a text processing apparatus, comprising, input means for inputting text data and instructions to print characters, printing means for feeding paper into position and printing characters on the paper, first storing means for storing text data, second storing means for temporarily storing text data, and control means for making the first and second storing means store the text data inputted, reading the text data in the first storing means in response to the instruction to print and making the second storing means temporarily store the same, and making the printing means print the text data stored in the second storing means. When the control means receives new text data and instructions to print, it reads the text data previously printed from the first storing means and makes the second storing means store the previously printed text data along with the new text data in serial order. The control means serially searches the text data and makes the printing means feed the paper without printing when the text data was previously printed but prints the text data when the text data is identified as the new text data.

Preferably, the control means includes timer means and adds date and time information to the inputted text data as additional data to be searched. The control means may also add a code to indicate the text has been printed and make the first storing means store the text data which has been printed.

According to the present invention, newly inputted text can be accurately printed contiguous to previously printed text on paper which has been previously printed.

BRIEF DESCRIPTION OF THE DRAWINGS

FIG. 3 is a diagram of the stored contents in a text buffer according to FIG. 2;

FIG. 6 is a diagram of the stored contents in a text buffer according to FIG. 5.

DESCRIPTION OF THE PREFERRED EMBODIMENTS

Now, preferred embodiments of the present invention will be described in detail with reference to the accompanying drawings.

Figure 1:
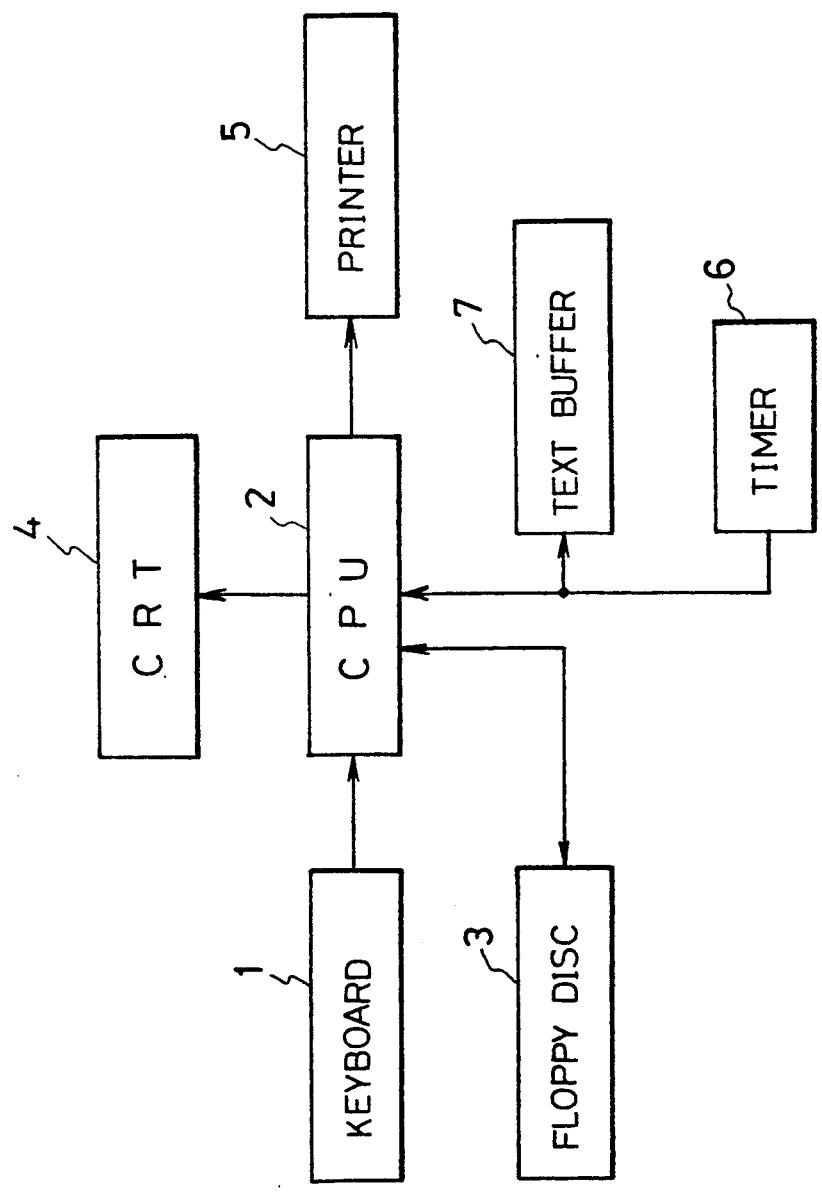
FIG. 1 is a block diagram showing a text processing apparatus used for implementing a text processing method according to the present invention.

FIG. 1 shows a schematic block diagram showing a text processing apparatus used for implementing a text processing method according to the present invention. Text data inputted by depressing keys on a keyboard 1 is processed in signal by a central processing unit 2 and stored in a floppy disc 3 while displayed on a display tube 4. Depressing a key on the keyboard 1 sends a print instruction to a printer 5 which prints characters. A timer circuit 6 continuously outputs information on date and time to the central processing unit 2. A text buffer 7 temporarily stores text data stored in and read from the floppy disc 3 and text data inputted through the keyboard 1.

Figure 2:
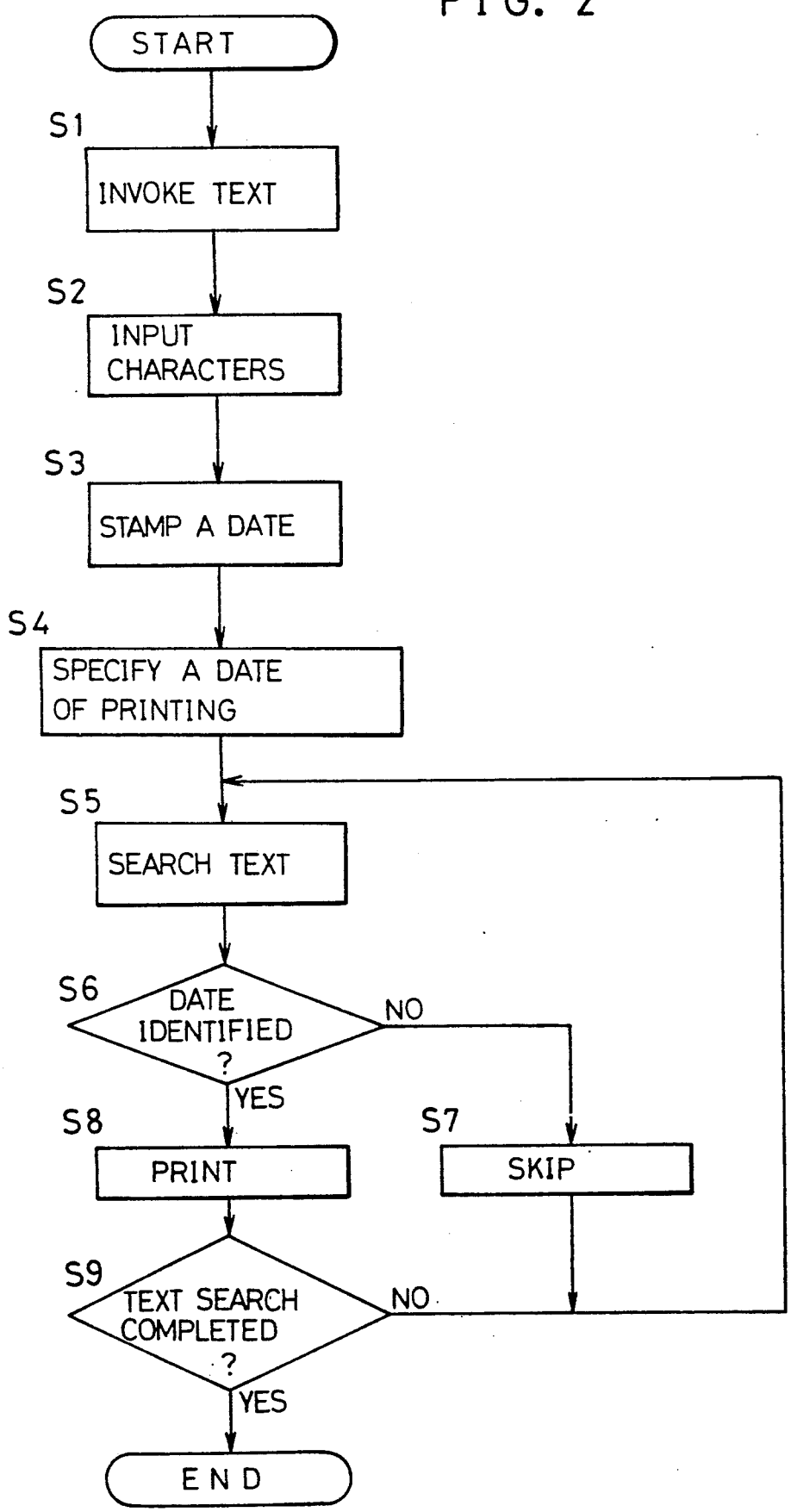
FIG. 2 is a flow chart showing an embodiment of the method of the present invention.
Figure 4:
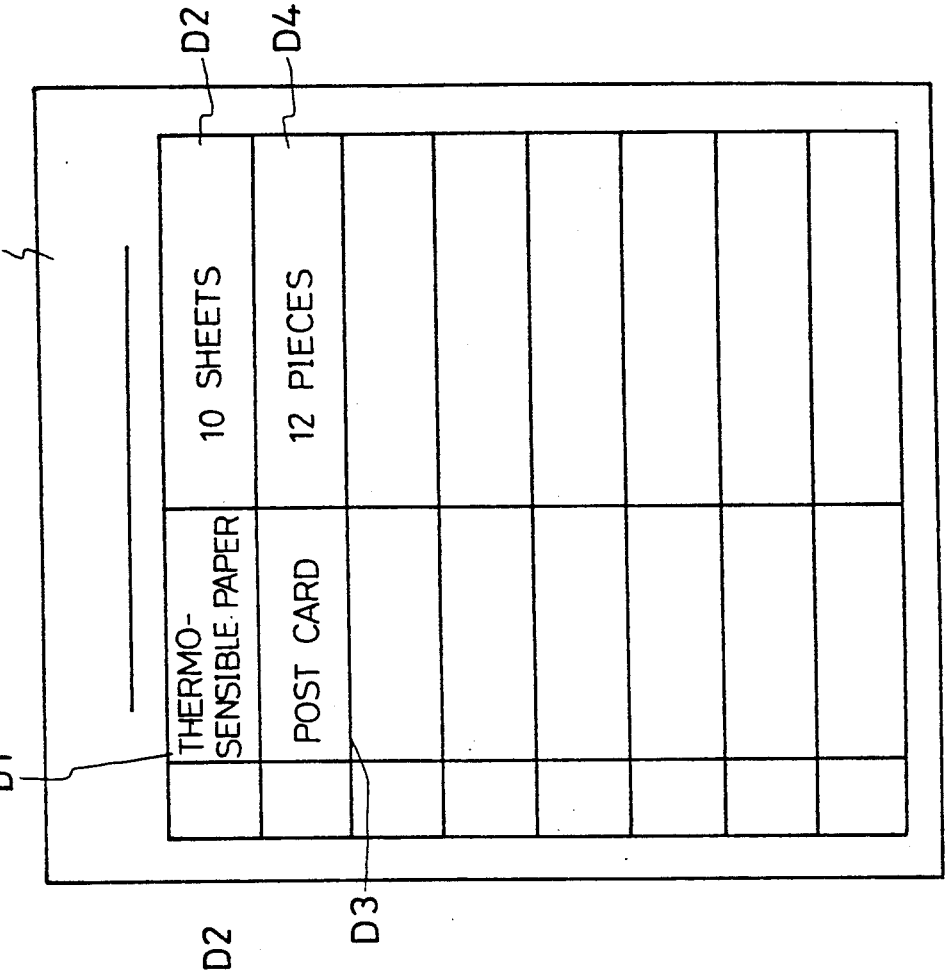
FIG. 4(a) and 4(b) is a plan view of the previously paper acording to the present invention.
Figure 4:
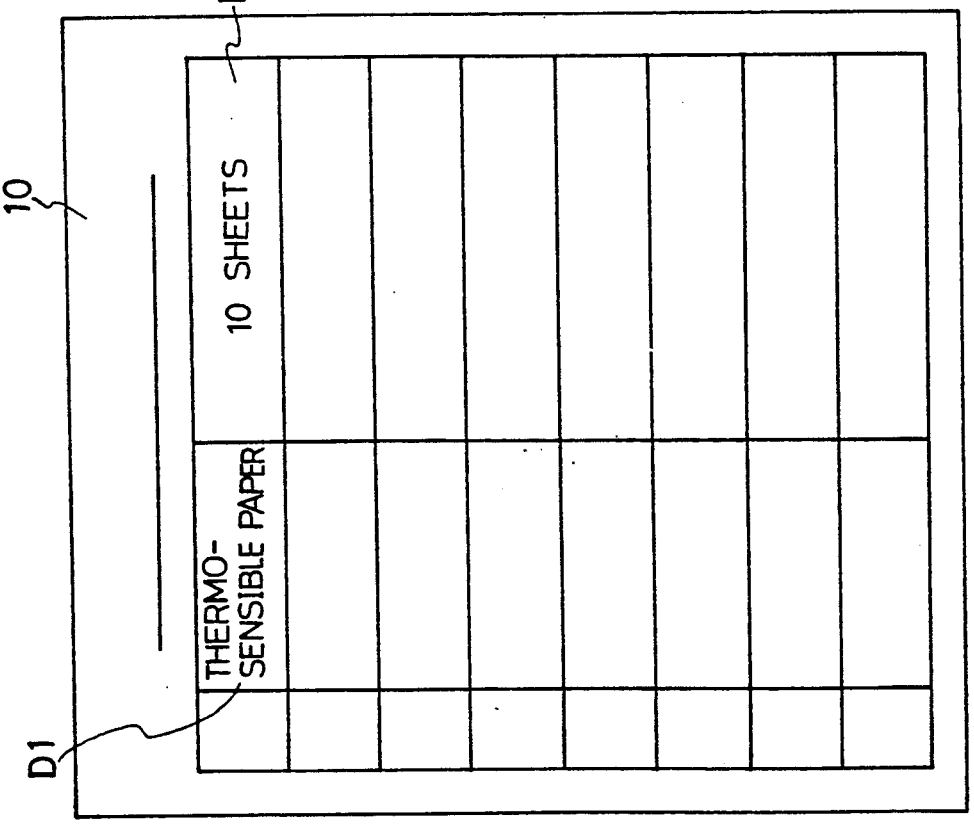

An embodiment of the method of the present invention employing the above-mentioned configuration will be described with reference to FIGS. 2 to 4. A method of keeping records of office supplies, as shown in FIG. 4, will be explained as an example. As shown in FIG. 4(a), text data D1 of "thermosensible paper" and text data D2 of "10 sheets" have been printed in series on a paper 10. When, as shown in FIG. 4(b), text data D3 of "Post Card" and text data D4 of "12 pieces" are next printed below the text data D1, D2 on the paper 10, the paper 10 partly printed with the characters shown in FIG. 4(a) is set on the printer 5 while the floppy disc 3 storing the text data D1, D2 which has already been printed is set in position. Then, as shown in FIG. 2, the stored text data D1, D2 are read from the floppy disc 3 (step 1), and they are temporarily stored in the text buffer 7 and displayed on the display tube 4.

Thereafter, as the next text data D3, D4 are inputted by the keyboard 1 (Step 2), the text data D3, D4 are stored in the floppy disc 3 and the text buffer 7, with the date information T3, T4 from the timer circuit 6 which is automatically associated with the stored contents. This is the step of stamping a date shown in FIG. 2 (step 3). As shown in FIG. 3, the text data D1, D2 read from the floppy disc 3 are also associated with date information T1, T2 relating to when they were stored and printed.

When a print instruction is made through the keyboard 1, the date on which the instruction is received is specified (Step 4). The text data D1 to D4 temporarily stored in the text buffer 7 are searched from the leading address in serial order (Step 5), to determine whether the date information T1 to T4 corresponding to the text data D1 to D4 correspond with the current date specified by the timer circuit 6 (Step 6). When the text data D1, D2 are searched, the result of Step 6 is "NO" because the date information T1, T2 corresponding to the text data D1 D2 do not correspond to the current date. The process proceeds to Step 7 and skips the next steps to jump to Step 5 after the printer 5 feeds the paper 10 without printing characters.

When the search reaches inputted text data D3, D4, both the dates correspond, and hence the text data D3, D4 are printed on the paper 10 (Step 8). Since the paper 10 was fed without printing by the above-mentioned skip process, the text data D3, D4 are accurately printed in the part without characters contiguous to the part of the paper with characters as shown in FIG. 4(B). When this procedure has been performed on all the text data D1 to D4 temporarily stored in the text buffer 7 and none remains therein, the result of Step 9 is a "Yes", and the text processing is completed.

Figure 5:
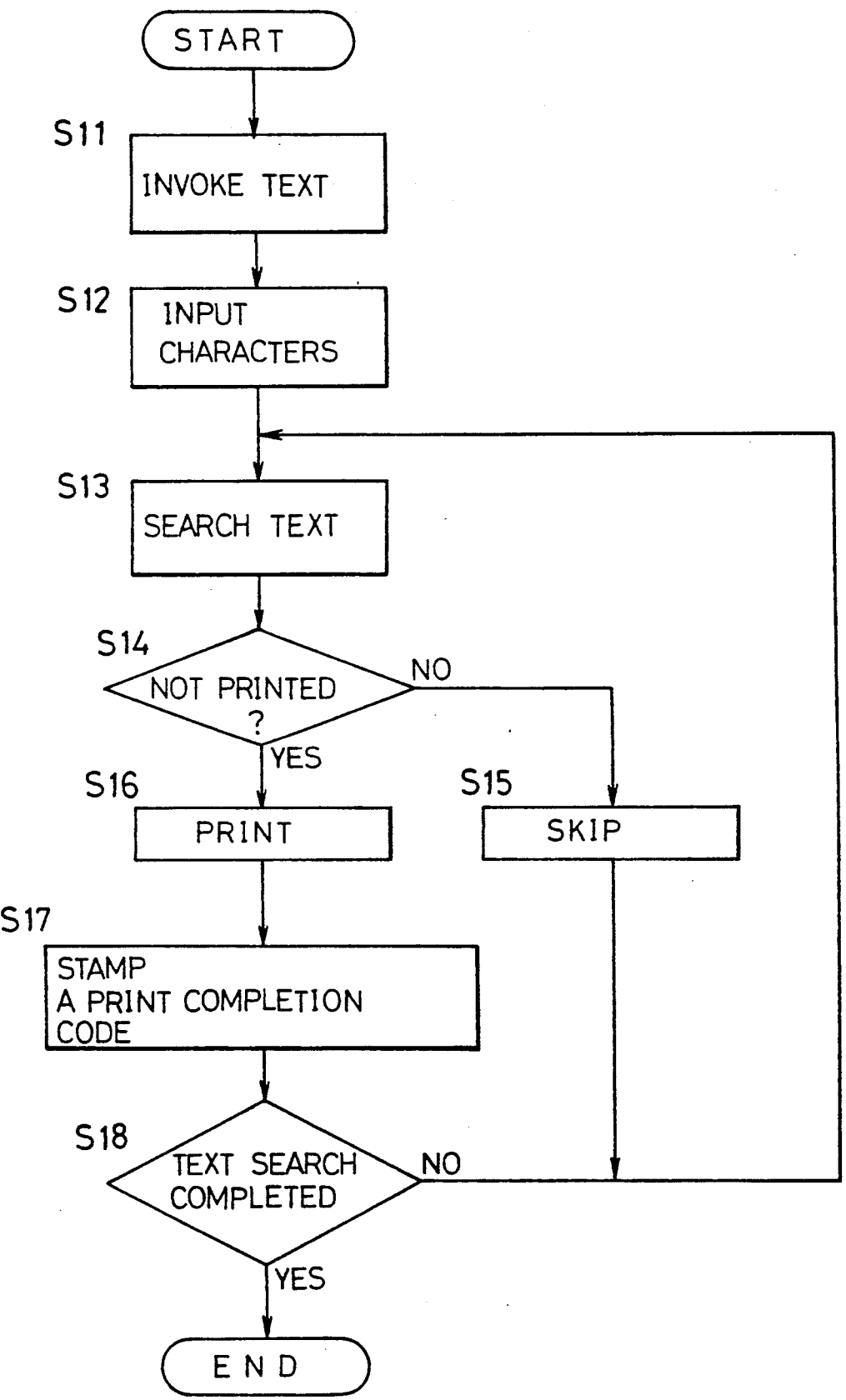
FIG. 5 is a flow chart of another embodiment of the method of the present invention.

FIG. 5 is a flow chart related to another embodiment of the method of the present invention, as explained below. Similar to the previous embodiment, the paper 10 on which characters have been partially printed, shown in FIG. 4(a), is set in the printer 5 while th floppy disc 3 storing the previously printed text data D1, D2, is set in position, and then the text data D1, D2 stored in the floppy disc 3 are read (Step 11). They are temporarily stored in the text buffer 7 and displayed on the display tube 4.

Then, as the text data D3, D4 are inputted by depressing the keys on the keyboard 1 (Step S12), the text data D3, D4 are stored in the text buffer 7 below the above-mentioned text data D1, D2. The contents stored in the text buffer is thus shown in FIG. 6.

When giving an instruction to print characters through the keyboard 1, the text data D1 to D4 temporarily stored in the text buffer 7 are serially searched beginning with the first address (Step 13) to determine if the text data D1 to D4 have been printed. This determination is based upon the code associated with each of the text data D1 to D4. A code "1" means the text has been printed, while a code "0" means the text has not been printed. As mentioned below, when the text data are printed, the code "1", meaning that the text has been printed, is associated (stamped) with the text data. Thus, the text data D1, D2 which have been printed are stamped with the code "1". When a search comes across the text data D1, D2, the result of Step 14 is "NO" because of the code "1"meaning that the text has been printed. The process proceeds to Step 15 and skips the next steps to jump to Step 13 and the printer 5 feeds the paper 10 without printing characters.

When the inputted text data D3, D4 are searched one after another, it is determined that the text data D3, D4 have not been printed, because of the code "0". Then, the text data D3, D4 are printed on the paper 10 one after another (Step 16), while the text data D3, D4 are stamped with the code "1" meaning that the text has been printed (Step 17). By feeding paper 10 without printing by the above-mentioned skip process, the text data D3, D4 are accurately printed in the required part contiguous to the part with previously printed characters as shown in FIG. 4(b). When this procedure has been performed on all the text data D1 to D4 temporarily stored in the text buffer 7 and none remains therein, the result of Step 18 is "YES", and the text processing is completed.

The present invention is not limited simply to the previous description and the accompanying drawings, but includes various modifications without departing from the scope of the appended claims. For example, the paper 10 on which characters have already been printed can be set in the printer 5 after new text data are inputted to the floppy disc 3.

As has been mentioned, in accordance with the text processing method according to the present invention, by setting previously printed paper in the printer and inputting new text data into a part contiguous to the pre-printed part, the data can be accurately printed. A series of text data inputted in the word processor at different times at different dates can be printed in series on a sheet of paper without laborious work.

We claim:

1. A text processing method comprising the steps of:
   setting paper, on which characters have been previously printed into a printer;
   inputting new text data;
   temporarily storing the text data corresponding to the characters which have been previously printed and the new text data;
   searching the text data corresponding to the characters which have been previously printed and the new text data in serial order;
   feeding the paper witout printing when the search comes across the text data corresponding to the characters which have been previously printed; and
   printing characters correspondirg to the new text data on the paper when the search comes across the new text data.

2. A text processing apparatus, comprising:
   input means for inputting view text data and instructions to print characters;
   printing means for feeding paper set in position and for printing characters on the paper;
   first storing means for storing text data;
   second storing means for temporarily storing text data; and
   control means for making said first and second storing means store the new text data, for reading the text data in said first storing means in response to the instruction to print and making said second storing means temporarily store the same along with the new text data in serial order, for serially searching the text data in said second storing means, and for making said printing means feed the paper without printing when the searched text data is identified as text data which has been printed but with printing the text data when the text data is identified as the new text data.

3. An apparatus according to claim 2, wherein said control means includes timer means and means for adding information on date and time to the new text data inputted.

4. An apparatus according to claim 2, wherein said control means includes means for adding a code to the text data representing that the text has been printed and making said first storing means store the code with the text data.

* * * * *